United States Patent
Puckette, IV

[11] 3,727,131
[45] Apr. 10, 1973

[54] ZERO-CROSSING JITTER DETECTION METHOD AND CIRCUIT

[75] Inventor: Charles McD. Puckette, IV, Scotia, N.Y.

[73] Assignee: General Electric Company, Schenectady, N.Y.

[22] Filed: June 22, 1971

[21] Appl. No.: 155,463

[52] U.S. Cl. ............... 324/77 R, 307/232, 307/237, 307/261, 307/295, 325/473, 328/26, 328/115, 328/167
[51] Int. Cl. ............................................. G01r 23/16
[58] Field of Search ............... 324/77 A, 77 R, 83 A; 307/232, 235, 237, 261, 262, 295; 328/16, 20, 26, 32, 109, 115, 150, 165, 167; 325/65, 473

[56] References Cited

UNITED STATES PATENTS

| | | | |
|---|---|---|---|
| 3,493,859 | 2/1970 | Singer et al. | 324/77 R |
| 3,559,080 | 1/1971 | Kobori et al. | 307/232 X |
| 3,051,905 | 8/1962 | Morris | 328/26 X |

Primary Examiner—Stanley T. Krawczewicz
Attorney—John F. Ahern et al.

[57] ABSTRACT

An electronic circuit and method for providing a d.c. voltage proportional to the randomness of the zero-crossings of an input sine wave signal includes a hard limiter for converting the sine wave to a square wave of the same frequency, a narrow band filter tuned to twice the frequency of the input sine wave signal for removing all the spectral energy except that centered at the second harmonic and a circuit for converting any energy at the output of the filter to a d.c. component which represents the randomness of the zero-crossings (zero-crossing jitter).

19 Claims, 5 Drawing Figures

Inventor
Charles McD. Puckette
by Louis A. Moucha

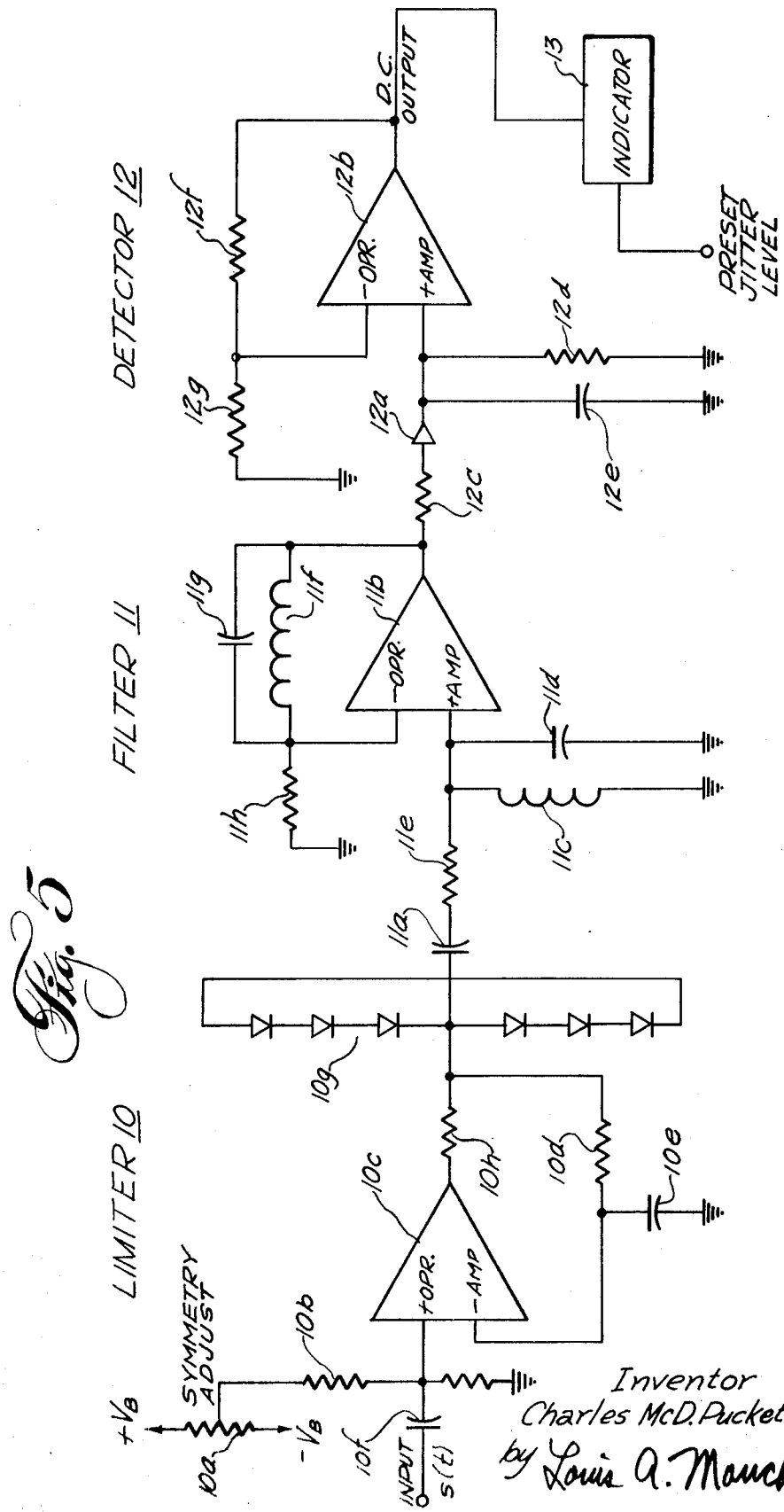

ZERO-CROSSING JITTER DETECTION METHOD AND CIRCUIT

My invention relates to an electronic circuit and method for measuring the randomness of the zero-crossings of a sine wave signal, i.e., zero-crossing jitter, and in particular, to a circuit and method for measuring the jitter in terms of the energy in the region of the second harmonic of a hard-limited form of the input sine wave signal.

An indication of the randomness of the zero-crossings of a sinusoidal waveform of electrical energy is of importance in many applications, especially when such waveform is a reference or timing signal. As one particular example, knowledge of the amount of jitter in various communication channels is a measure of the quality of the channels.

The use of a synchronous data format in high speed digital communication systems requires that a (time base) waveform be established in the receiver which will specify when a decision is to be made as to the data being received. In the case of the communication channel, over which the data is transmitted, being a normal voice grade telephone line, it has become common to derive the receiver time base waveform with a sinusoidal waveform pilot tone transmitted with the data. The pilot tone is hard-limited in the receiver to yield the receiver time base waveform. As a result of effects such as rapidly varying parameters and, or, high noise levels on the telephone line communication channel, the point in time that the decision is made will vary about a nominal value due to jitter on the receiver time base waveform. If the jitter is too high, due to the poor quality of the telephone line, the system will not operate properly and a high error rate will occur thereby rendering the line unsuitable as a communication channel. It is desirable therefore, specifically, to monitor the jitter associated with the receiver time base waveform such that the existence of an unsuitable channel may be readily determined, and broadly, to monitor the randomness of the zero-crossings of a sine wave signal.

Therefore, one of the principal objects of my invention is to provide a circuit and method for monitoring the randomness of the zero-crossings (zero-crossing jitter) of a sinusoidal waveform of electrical energy.

Another object of my invention is to provide a zero-crossing jitter detector circuit which operates on the concept that a sinusoidal waveform, after being converted to a square wave, has no energy at the even harmonics except that due to the jitter component.

A further object of my invention is to provide a zero-crossing jitter detector circuit of relatively simple and inexpensive design suitable for continuous monitoring of a communication channel.

Briefly, in accordance with my invention, I provide an electronic zero-crossing jitter detection method and circuit which includes a hard limiter for converting an input sinusoidal waveform of electrical energy to a square waveform of repetition rate equal to the fundamental frequency of the sinusoidal waveform. Any time deviation between the zero crossings of the square waves and a jitter-free version of the sinusoidal waveform having a fixed fundamental frequency is due primarily to zero-crossing jitter. A narrow band filter tuned to twice the fixed frequency of the jitter-free input sine wave signal is connected to the output of the hard limiter for removing all of the spectral energy except that centered at the second harmonic which is due to the zero-crossing jitter. An envelope detector connected to the output of the filter converts any second harmonic energy at the filter output to a d.c. component which is directly proportional to the magnitude of the zero-crossing jitter in the input sinusoidal waveform. The magnitude of the d.c. output may be displayed on a suitable read-out device or used to trigger an indicator upon the d.c. level exceeding a preset value.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character, and wherein:

FIG. 5 is a schematic diagram of my zero-crossing jitter detector circuit.

Figure 1:
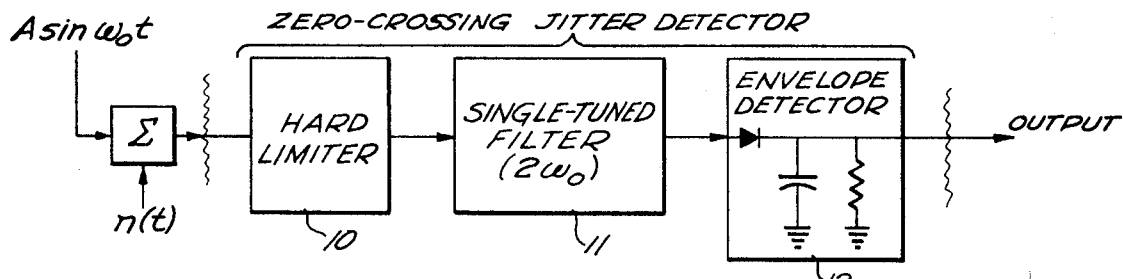
FIG. 1 is a block diagram of my zero-crossing jitter detector circuit.

Referring now to FIG. 1, there are shown the basic elements of my zero-crossing jitter detector circuit. The input to the circuit is a sinusoidal waveform signal of electrical energy which may correspond to the pilot tone used to derive the receiver time base waveform in a digital communication system application of my invention. The fundamental frequency $f_o$ of the input sinusoid $A \sin\omega_o t$ is $\omega_o/2\pi$, the terms $f_o$ and $\omega_o$ being used synonymously hereinafter. It is assumed that a noise component $n(t)$, due primarily to thermal noise, is superimposed on the input sinusoid. It is also assumed that the noise-free input sinusoid $A \sin\omega_o t$ may exhibit some randomness of the zero-crossings, this effect in the digital communication system application of my invention being due primarily to varying parameters in the communication channel which may be a normal voice grade telephone line as one example. Thus, the randomness of the zero-crossings of the input sine wave, hereinafter described as the zero-crossing jitter, is due to several effects including both slowly and rapidly varying parameters on the communication channel and spurious noise such as that due to thermal noise.

Figure 2:
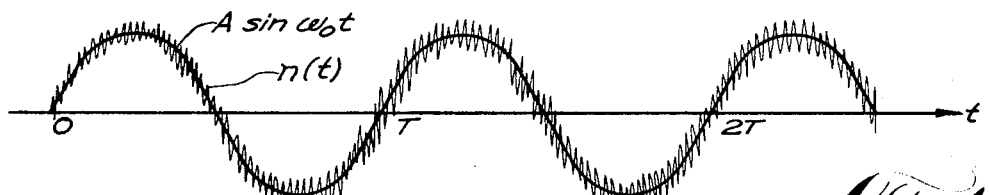
FIG. 2 is a sketch of the sinusoidal waveform supplied to the input in FIG. 1, including the effect of noise superimposed thereon.

The input to my zero-crossing jitter detector circuit is thus of the form:

$$s(t) = A \sin\omega_o t + n(t) \quad (1)$$

where the frequency of $A \sin\omega_o t$ may be slightly variable about $\omega_o$ due to the randomness described hereinabove, and the frequency of $s(t)$ is even more variable about $\omega_o$ due to noise component $n(t)$. A sketch of waveform $s(t)$ (amplitude versus time) is contained in FIG. 2.

The input sinusoidal waveform $s(t)$ is supplied to the input of a hard limiter circuit 10 or any other suitable circuit for converting the input waveform to a square wave of repetition rate equal to the fundamental frequency (somewhat variable about $\omega_o$) of the input sinusoidal signal. Any time deviation between the zero crossings of the square waves and sinusoidal waveform of fixed fundamental frequency $\omega_o$ (i.e., any randomness of the zero-crossings of the square waves) is due primarily to the zero-crossing jitter described hereinabove. The square wave form version of input signal $s(t)$ is supplied to a narrow band filter 11 tuned to twice the fixed frequency of the input sinusoid in ideal jitter-free form. As one example, filter 11 may be a single-tuned filter resonant at fixed frequency $2\omega_o$ to thereby remove substantially all of the spectral energy at the output of the hard limiter except that centered at the second harmonic of the idealized form of the input sinusoidal waveform signal. My invention is based on the fact that a square wave of fixed repetition rate has no energy at the second harmonic of the repetition rate and thus any energy in the region of the second harmonic (or any higher order even harmonic) is due to a frequency modulation introduced by randomness of the zero crossings of the input sinusoid $s(t)$.

The output of filter 11 is supplied to the input of a circuit means 12 for translating the spectral energy of the filter output to baseband from which a d.c. level may be obtained. Thus circuit 12 converts any energy at the output of the filter to a d.c. component, and as one example, such means comprises what is known in the electronics art as an envelope detector. Envelope detector 12 is basically a half-wave (or full-wave) rectifier followed by a suitable low-pass filter for smoothing the pulsating rectified output of the filter and thereby obtaining the d.c. component. Alternatively, the rectifier may be replaced by a conventional square-law detector. The magnitude of the d.c. voltage at the output of the envelope detector 12 is directly proportional to the magnitude of the zero-crossing jitter in the input waveform $s(t)$. This d.c. output may be suitably recorded and thereby provide continuous monitoring of the zero-crossing jitter. In the particular hereinabove mentioned application of monitoring the time base jitter in a digital communication receiver time base waveform, a d.c. level exceeding a predetermined value indicates the existence of an unsuitable communication channel.

The randomness of the zero crossings of the input signal $s(t)$ is also a form of frequency modulation on the idealized waveform a $\sin \omega_o t$ having fixed frequency $\omega_o$. Thus, my zero-crossing jitter detector circuit is also adapted for the detection of low deviation frequency modulation signals and, as implied above, any energy in the region of the second harmonic of the input signal is due to the frequency modulation deviation and is a measure of such quantity.

Figure 3:
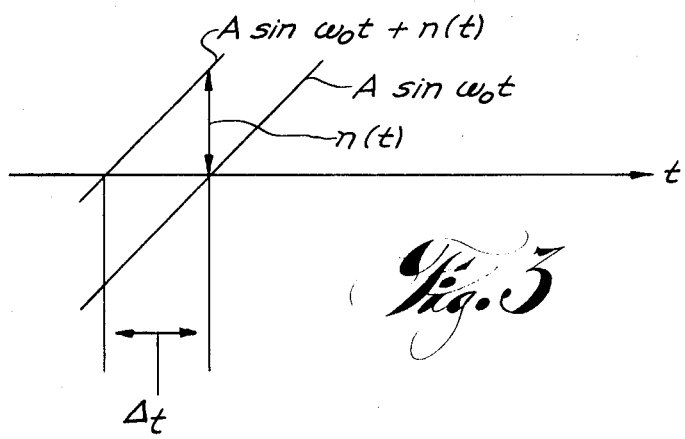
FIG. 3 illustrates the zero-crossing error (jitter) in the input sinusoidal waveform due to the noise component.

The quantity of interest in my zero-crossing jitter detector circuit is the randomness associated with the point in time that the limiter 10 output changes level which corresponds to the randomness of the zero crossings of input signal $s(t)$. The output of the limiter in the absence of jitter would be a square wave of repetition rate equal to a fixed fundamental frequency $\omega_o$. Assuming these ideal characteristics, the limiter output assumes a fixed positive and negative level as the input waveform $s(t)$ respectively becomes positive and negative valued. However, due to presence of jitter for reasons stated above, there occurs a randomness associated with the point in time that the limiter output changes level which can be likened to a low frequency modulation superimposed on the limiter square wave output. The zero-crossing jitter may be determined with reference to FIG. 3 wherein $\Delta t$ is the zero-crossing error along a time base $t$ due to an equivalent noise $n(t)$ which for purposes of this mathematical exercise, includes the randomness of zero crossings of sinusoid component $A \sin \omega_o t$. Assuming that the slope of the waveform is essentially the same with or without this equivalent noise, the slopes of the respectively distorted and undistorted functions, $A \sin\omega_o t + n(t)$ and $A \sin\omega_o t$, may be equated to yield:

$$[n(t)/\Delta t = A\omega_o \quad (2)$$

Figure 4:
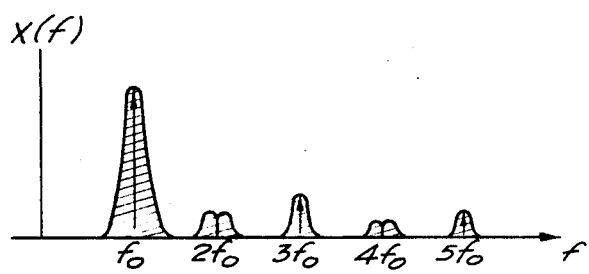
FIG. 4 is a plot of the spectrum of the energy at the output of the hard limiter in FIG. 1.

Since $\Delta t$ is a random variable, it may best be described in terms of its variance since its mean is zero. Solving for $\Delta t$ and computing the standard deviation yields:

$$\sigma_T = (T_o/2\pi)/[2S/N]^{1/2} \quad (3)$$

where $T_o$ is the nominal period of the square wave and $S/N$ is the input signal-to-noise power ratio. The spectrum of this square wave is illustrated in FIG. 4 wherein the fundamental and each of the odd harmonics ($f_o$, $3f_o$, $5f_o$ ---) is spread in Gaussian fashion and the residual energy existing at the even harmonics is due to the frequency modulation produced by the zero-crossing randomness. The narrow band filter 11 removes all the spectral energy except the frequency modulation portion produced by the zero-crossing randomness, and the energy at the filter output is similar in appearance to narrow band filtered Gaussian noise. This quantity, after being rectified, becomes a d.c. component which is directly proportional to the amount of frequency modulation of the square wave existing at the output of hard limiter 10, and therefore also is directly proportional to the magnitude of the randomness of the zero-crossings (i.e., the zero-crossing jitter).

Referring now to the schematic diagram of FIG. 5, hard limiter 10 includes a variable input resistance network designated "symmetry adjust" which prOvides for the nulling out of the second harmonic of the square wave. This input resistive network includes a resistor 10a having the ends thereof connected across a bipolarity bias voltage source $V_B$ and the resistor tap is connected through a decoupling resistor 10b to the positive polarity input of a conventional operational amplifier 10c. Symmetry adjust resistor 10a compensates for factors such as a nonsymmetrical input voltage swing characteristic of the operational amplifier to thereby substantially increase the input signal dynamic range, and for the presence of various distorting bias currents in the amplifier input circuit. The symmetry adjustment control thus provides a compensating bias voltage to operational amplifier 10c for improving symmetry of the input waveform $s(t)$ about a zero voltage reference and thereby aid in nulling out the second harmonic (and other even harmonics) of the square wave at the output of diode circuitry 10g in the absence of any jitter in the input signal.

Operational amplifier 10c provides sufficient gain such that the hard limiter circuit limits on input signals $s(t)$ in the millivolt range, and is capable of accepting input signals having amplitudes of several volts. Input signal $s(t)$ is supplied to the positive polarity input terminal of amplifier 10c by means of coupling capacitor 10f. Amplifier 10c functions as a buffer to provide a high impedance to diode clipper circuit 10g. The output impedance of amplifier 10c and its peak saturated output voltage is a function of the polarity and amplitude of input signal $s(t)$. In order to operate the diode clipper circuit 10g as linearly and symmetrical as possible, it is necessary to reduce the variation in the amplifier output circuit parameters. One of several known means for accomplishing this reduction includes the connection of a resistor 10h between the output terminal of amplifier 10c and diode clipper circuit 10g. Resistor 10h is of sufficiently high resistance to neutralize the smaller amplifier output impedance variations.

A negative feedback around amplifier 10c compensates for any voltage offset effects which may tend to occur at the output of amplifier 10c and thereby assures a more precise symmetric clipping or hard limiting of input signal $s(t)$ relative to ground. The feedback is a low pass filter consisting of resistor 10d connected between the output of amplifier 10c and the negative polarity input terminal thereof, and a capacitor 10e connected from the output end of resistor 10d to ground. This R-C network thereby provides a d.c. feedback of the average output voltage of amplifier 10c to thereby minimize the effect of any amplifier output offset voltage.

Diode clipper circuit 10g is connected between ground and the juncture of resistors 10d and 10h. Circuit 10g includes two arrangements of the same type diodes connected in opposite polarity sense, to obtain symmetric clipping of both polarities of the square wave appearing at the output end of resistor 10h. Each diode arrangement may include one or an identical plurality of serially connected diodes, the number of diodes determining the maximum level of the clipped waves.

A capacitor 11a connected to the juncture of the diodes 10g and resistor 10h functions to couple the symmetric square wave (hard limited version of input signal $s(t)$) to the input of the narrow band filter circuit 11. Narrow band filter 11 is basically a cascade of two single-tuned filters each tuned to frequency $2\omega_o$ to thereby improve the rejection of the fundamental frequency $\omega_0$. Filter 11 includes an operational amplifier 11b having a first of the two filters connected in the input circuit and the second filter connected in a negative feedback circuit thereof. The operational amplifier network therefore provides a frequency-selective gain and may also be described as an active filter. The first single-tuned filter comprising a parallel inductor-capacitor circuit is connected between the positive polarity input terminal of amplifier 11b and ground. The inductor 11c and capacitor 11d are of value to provide resonance at the second harmonic ($2\omega_o$) of the idealized (jitter-free) input sinusoidal signal $s(t)$. A resistor 11e having a relatively high value resistance is connected between coupling capacitor 11a and the positive polarity input terminal of amplifier 11b to provide a high source impedance from the limiter 10. The second single-tuned filter consisting of parallel connected inductor 11f and capacitor 11g is connected between the output of amplifier 11b and the negative polarity input thereof. A resistor 11h of relatively low value resistance is connected between the negative polarity input terminal of amplifier 11b and ground to provide a ground reference and also determine the gain of the operational amplifier at the resonant frequency of the two filters. The inductors and capacitors in the two filters are preferably respectively of equal value inductance and capacitance. The common single resonant peak of the two filters obtains a narrow band filter arrangement whereby signals of energy only at or very close to the second harmonic $2\omega_o$ of the input signal $s(t)$ are transmitted from the output of operational amplifier 11b. This occurs since the parallel arrangement of each filter presents a high impedance at the resonant frequency $2\omega_o$, thereby passing substantially all of any $2\omega_o$ resonant frequency energy signal at the limiter output to the positive polarity input terminal of amplifier 11b and provides substantially no negative feedback thereof. At all other frequencies, the filters present lesser impedances whereby the first (input) filter tends to bypass the input signal to ground rather than directing it to the positive polarity input terminal of amplifier 11b and the second (feedback) filter provides negative feedback, the bypassed and feedback components increasing in magnitude with increased divergence of the limiter output energy signal from resonant frequency $2\omega_o$.

The circuit for converting any (second harmonic) energy at the output of filter 11 to a d.c. component basically includes a device or circuit for obtaining rectification (half-wave, or full-wave) of any signal at the output of filter 11, and a suitable low-pass filter for smoothing out the rectifier output pulses and thereby obtaining a substantially nonpulsating voltage signal (the d.c. component). As one example, a half-wave rectifier embodiment of a suitable rectifier is a diode 12a connected between the output of filter 11 and the positive input terminal of an operational amplifier 12b. A resistor 12c of low value resistance is connected between the output terminal of operational amplifier 11b and the anode of diode 12a for preventing amplifier 11b from becoming loaded when diode 12a conducts. The low pass filter connected at the output of rectifier 12a includes, as one example, a parallel network of resistor 12d and capacitor 12e connected between the positive input terminal of amplifier 12b and ground. Operational amplifier 12b is a relatively low gain device and functions as a buffer to provide a high input impedance and thereby prevent loading of capacitor 12e at the input thereof. Resistors 12f and 12g associated with the negative feedback circuit of operational amplifier 12b determine the gain thereof. The output of operational amplifier 12b is a d.c. voltage having a magnitude directly proportional to the degree of zero-crossing jitter in the input waveform $s(t)$. This d.c. component may be monitored in any suitable manner to indicate the state of the zero-crossing jitter. Thus, the output of operation amplifier 12b may be connected to and recorded on a d.c. voltmeter, if desired, or continuously recorded on a suitable recording device. A more desirable read-out for many applications is a suitable indicator 13 such as an alarm device for providing an optical or audible signal which indicates the presence of an input signal $s(t)$ having a zero-crossing jitter in excess of a given value as determined by a preset jitter level supplied to the indicator 13. Thus, indicator 13 assumes an ON state when the d.c. output of operational amplifier 12b exceeds a bias corresponding to the preset jitter level. Although this latter threshold mode of operation of my jitter detector circuit finds many applications, it may also be desirable to continuously record the d.c. output of amplifier 12b for detecting slowly varying changes in parameters of a communication channel, the output of which is connected to the input of the jitter detector circuit.

As one specific example of the application of my zero-crossing jitter detector circuit as a receiver time base jitter detector circuit in a high speed digital communication system, the sinusoidal pilot tone used to derive the receiver time base waveform has a frequency of 2400 Hertz whereby the two filters in narrow band filter 11 are each resonant at 4800 Hertz. The desired resonance may be obtained by designing the L-C circuits with an inductance of 125 millihenries and capacitance of 0.0088 microfarads ($\mu f$). Resistors 11e and 11h have values of 100,000 and 1,000 ohms, respectively, and coupling capacitor 11a has a capacitance of 1 $\mu f$. In hard limiter circuit 10 the symmetry adjust resistor 10a has a resistance of 25,000 ohms and is connected across a voltage source of ±5 volts d.c. Resistors 10b and 10h have values of 10,000 and 1,500 ohms, respectively. The R-C low pass filter which provides a d.c. feedback around amplifier 10c has values of 11,000 ohms and 50 $\mu f$. In envelope detector circuit 12, resistor 12c has a value of 1,000 ohms. Resistors 12f and 12g in the feedback circuit are each of 10,000 ohms to provide a gain of 2 for the operational amplifier. The R-C low pass filter at the output of half-wave rectifier 12a has values of one megohm and 50 $\mu f$. The three operational amplifiers 10c, 11b and 12b are each of the LM 307 type with a power supply of ± 12 volts, and diodes 10g and 12a are of the FD-100 type.

From the foregoing description, it can be appreciated that my invention makes available a simple method and simple and inexpensive electronic circuit for detecting the randomness of the zero-crossings (i.e. zero-crossing jitter) of a sine wave signal which operates on the concept that a sinusoidal waveform after being hard-limited, and thereby converted to a square wave, has no energy at the second harmonic except that due to the jitter component. The relative simplicity and inexpensive design of my circuit renders it especially suitable for commercial usage in the continuous monitoring of various communication channels including high speed digital communication systems. Although only one embodiment of my invention has been illustrated herein, it should be apparent that elements such as the operational amplifiers may be replaced by other type voltage amplifying devices, and one or more of such amplifiers may be omitted in particular applications. Finally, various other type elements may be employed in the hard-limiter 10, narrow band filter 11 and envelope detector 12 circuits, the criteria being that such circuits operate to provide the desired stated functions. Thus, it should be understood by those skilled in the art that various changes may be made in the illustrated embodiment of my invention without departing from the spirit and scope of my invention as defined by the following claims.

What I claim as new and desire to secure by Letters Patent of the United States is:

1. A zero-crossing jitter detector circuit comprising means for converting an input waveform of electrical energy $s(t) = A \sin\omega_o t + n(t)$ to a square waveform of repetition rate equal to the fundamental frequency $\omega_o$ to thereby have no energy in the square waves of fixed repetition rate at the second harmonic $2\omega_o$ of the repetition rate, any randomness of the zero crossings of the square waves being due primarily to zero-crossing jitter in the input waveform $s(t)$, filter means in communication with an output of said square wave converting means for removing substantially all of the spectral energy except that centered at the second harmonic frequency $2\omega_o$ wherein any energy present at frequency $2\omega_o$ is due primarily to the zero-crossing jitter, and means in communication with an output of said filter means for converting any energy at the output of said filter means to a d.c. component which is thereby directly proportional to the magnitude of zero-crossing jitter in the input waveform $s(t)$.

2. The zero-crossing jitter detector circuit set forth in claim 1 wherein said square wave converting means is a hard limiter circuit.

3. The zero-crossing jitter detector circuit set forth in claim 2 wherein said hard limiter circuit includes means for providing symmetrical clipping of the input waveform $s(t)$ whereby the square wave output thereof is symmetrical relative to ground potential.

4. The zero-crossing jitter detector circuit set forth in claim 1 wherein said filter means is a narrow bandpass filter having a center frequency of $2\omega_o$.

5. The zero-crossing jitter detector circuit set forth in claim 1 wherein said filter means is a single-tuned inductor-capacitor filter tuned to frequency $2\omega_o$.

6. The zero-crossing jitter detector circuit set forth in claim 1 wherein said filter means is a cascade of two single-tuned filters each tuned to frequency $2\omega_o$ to thereby improve rejection of the fundamental frequency $\omega_o$.

7. The zero-crossing jitter detector circuit set forth in claim 1 wherein said d.c. component converting means is an envelope detector.

8. The zero-crossing jitter detector circuit set forth in claim 7 wherein said envelope detector comprises a rectifier having an input connected to an output of said filter means and a first low pass filter having an input connected to an output of said rectifier.

9. The zero-crossing jitter detector circuit set forth in claim 1 and further comprising means in communication with an output of said d.c. component converting means for detecting the magnitude of the d.c. component to thereby determine the magnitude of the zero-crossing jitter.

10. The zero-crossing jitter detector circuit set forth in claim 1 and further comprising means having a first input in communication with an output of said d.c. component converting means and a second input in communication with a bias source representing a predetermined jitter level to thereby provide a threshold mode of operation wherein the latter means is triggered to indicate the presence of an input waveform $s(t)$ having a zero-crossing jitter in excess of the predetermined level established by the bias input.

11. The zero-crossing jitter detector circuit set forth in claim 3 wherein
said hard limiter circuit comprises
a first operational amplifier provided with a positive polarity input adapted to be supplied with the input waveform $s(t)$, and
a diode clipper circuit connected between an output of said first operational amplifier and ground, said diode circuit including at least two diodes of the same type connected in opposite polarity sense.

12. The zero-crossing jitter detector circuit set forth in claim 11 wherein
said symmetrical clipping means includes a variable input resistor network connected to a source of bias voltage, output of said resistOr network connected to the positive polarity input of said first operational amplifier to provide thereto a compensating bias voltage for improving symmetry of the input waveform $s(t)$ about a zero voltage reference and thereby aid in nulling out any even order harmonica of the square wave at the output of said diode clipper circuit in the absence of any zero-crossing jitter in input waveform $s(t)$.

13. The zero-crossing jitter detector circuit set forth in claim 12 wherein
said symmetrical clipping means further includes a second low pass filter connected from an output of said first amplifier to a negative polarity input thereof to provide a negative d.c. feedback of the average output voltage of said first amplifier for compensating for amplifier output offset voltage.

14. The zero-crossing jitter detector circuit set forth in claim 6 wherein
said filter means further comprises a second operational amplifier provided with a positive polarity input in communication with an output of said square wave converting means,
a first of said two filters connected from the positive polarity input of said second amplifier to ground,
a second of said two filters connected from an output of said second amplifier to a negative polarity input thereof,
said two filters each being of the parallel inductor-capacitOr type.

15. The zero-crossing jitter detector circuit set forth in claim 8 wherein
said envelope detector further comprises a third operational amplifier for providing a high impedance buffer at the output of said jitter detector circuit, said third amplifier provided with a positive polarity input connected to the cathode of said rectifier, the anode of said rectifier in communication with an output of said filter means, said first low pass filter connected from the positive polarity input of said third amplifier to ground.

16. A circuit for measuring the randomness of the zero-crossings of electrical sine wave signals comprising
a hard limiter having an input adapted to be provided with a sine wave signal,
a narrow band filter tuned to twice the frequency of the input sine wave signal, said filter connected to an output of said hard limiter, and
an envelope detector connected to an output of said narrow band filter for translating the spectral energy of the hard limited second harmonic of the input sine wave signal to baseband and obtaining a d.c. voltage component which is directly proportional to the randomness of the zero-crossings of the input sine wave signal.

17. A method for detecting the randomness of the zero-crossings of an input sinusoidal waveform of electrical energy comprising the steps of
converting the input sinusoidal waveform to a square waveform of repetition rate equal to the fundamental frequency of the input sinusoidal waveform to thereby have no energy in the square waves of fixed repetition rate at the second harmonic of the repetition rate,
filtering out substantially all of the spectral energy of the square waveform except that centered at the second harmonic of the fundamental frequency of the input sinusoidal waveform, and
converting any energy of the square waveform centered at the second harmonic frequency into a d.c. voltage which is directly proportional to the magnitude of randomness of the zero-crossings of the input sinusoidal waveform.

18. The method set forth in claim 17 and further comprising the step of
continuously recording the d.c. voltage to thereby obtain continuous monitoring of the randomness of zero-crossings of the input sinusoidal waveform.

19. The method set forth in claim 17 and further comprising the step of
comparing the d.c. voltage with a bias voltage representing a predetermined random zero-crossing level to thereby provide a threshold mode of operation indicative of the presence of an input sinusoidal waveform having a randomness of zero-crossings in excess of the predetermined level.

* * * * *